2,769,184

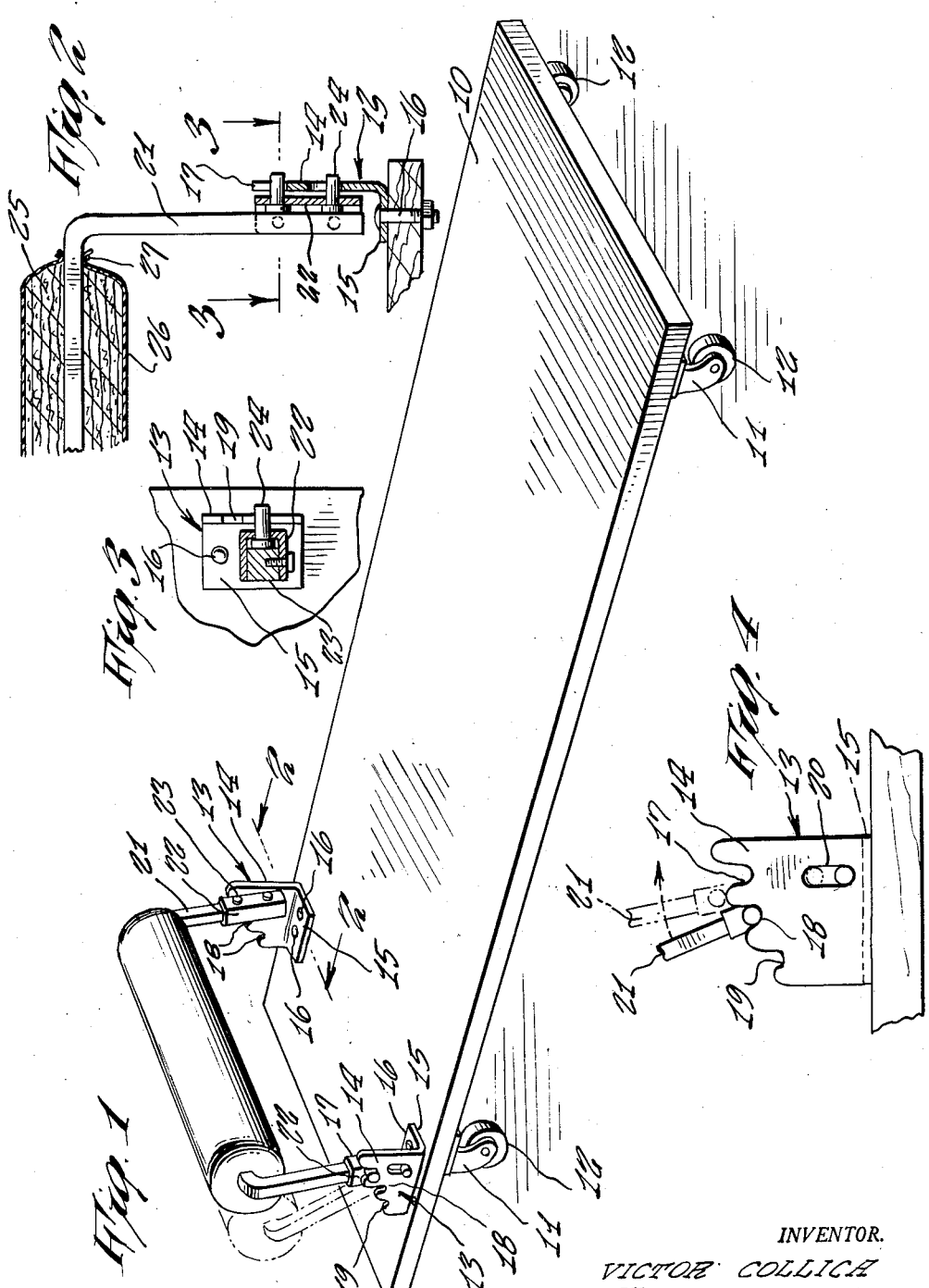

CREEPER HEADREST

Victor Collica, Bronx, N. Y.

Application August 17, 1953, Serial No. 374,731

1 Claim. (Cl. 5—327)

This invention relates to creepers for auto and truck mechanics.

Ordinary creepers with a plain flat head rest are very impractical and uncomfortable to work with.

It is accordingly a principal object of the present invention to provide a creeper head rest which is fully adjustable and which is readily adaptable to any creeper currently manufactured by simply drilling mounting holes.

It is another object of the present invention to provide a creeper head rest wherein the mechanic merely has to raise his head and position the headrest in the most comfortable position, the invention relieving strain on the neck muscles.

Other objects of the present invention are to provide a creeper head rest bearing the above objects in mind which is of simple construction, inexpensive to manufacture, has a minimum number of parts, easy to install and efficient in use.

For other objects and a better understanding of the invention, reference may be had to the following detailed description taken in connection with the accompanying drawing, in which:

Figure 1 is a perspective view of the invention, showing in phantom an alternate position of the head rest;

Fig. 2 is a fragmentary vertical sectional view taken along the line 2—2 of Fig. 1;

Fig. 3 is a transverse sectional view taken along the line 3—3 of Fig. 2;

Fig. 4 is an enlarged side elevational view of one of the adjusting plates and showing in phantom the head rest being moved toward another position.

Referring now to the drawing, there is shown a rectangular platform 10 adapted to support the body of a mechanic thereon. Suitably mounted at the four corners of the platform are the bases 11 of casters 12 which are so mounted on the bottom of the platform 10 as to permit the desired swiveling and universal movement of the platform in all directions.

In the practice of my invention, a pair of adjusting plates 13 of substantially L-shaped cross section are provided and include a side portion 14 and a base portion 15. The base portions 15 are provided with a pair of mounting openings adapted to be aligned with a corresponding pair of openings provided in each side of the platform 10 and secured thereto by means of screws 16. The upper edge of the side portions 14 is provided with three notches 17, 18 and 19 for a purpose which will hereinafter become clear. The side portions 14 are also provided with vertical elongated slots 20.

A U-shaped bar 21 is provided, the free end of the bar 21 being adapted to fit between the side portions 14. A pair of brackets 22 of U-shaped cross section are secured to the ends of the bar 21 by means of screws 23, the side of the brackets 22 adjacent the side portions 14 being provided with a pair of vertically spaced openings within which are positioned rivets 24 with the head of the rivet intermediate the bar 21 and the bracket 22 (Fig. 3). The rivets 24 are spaced so that the uppermost rivet will fit snugly within one of the notches 17, 18 or 19, with the lowermost rivet resting at the bottom of slot 20. Thus, when it is desired to change the angulation of the bar 21 relative to platform 10, it is only necessary to pull the bar 21 upwardly to the dotted line position of Fig. 4, whereupon the uppermost rivet may be rotated to the next notch, whereupon the lowermost rivet will again move down to the bottom of the slot 20 to lock the bar.

Cylindrical padding 25 (Fig. 2) is wrapped around the horizontal portion of the bar 21 and a leatherette covering 26 is placed thereon and tied at each end by cord 27, providing a comfortable head rest which may be readily and easily adjusted by the mechanic lying on the creeper 10 under a car or truck, merely by raising his head and positioning the head rest in the most comfortable position. The bar 21 is formed of square steel while the brackets 22 and the adjustable plates 13 are stamped from sheet steel. Instead of the square stock 21, round stock may be used. By using such round stock, holes may be drilled directly therethrough to install a pair of vertically spaced pins corresponding to the rivets 24, and by spot welding or riveting such pins in the round stock, it is possible to eliminate the brackets 22. Such a construction is more economical and is better looking.

While various changes may be made in the detail construction, it shall be understood that such changes shall be within the spirit and scope of the present invention as defined by the appended claim.

Having thus set forth and disclosed the nature of my invention, what is claimed is:

A head rest for creepers comprising a pair of adjustable first brackets of substantially L-shaped cross section mounted at each side of the creeper near one end, the vertical portions of said first brackets along the upper edge being provided with a plurality of notches, said vertical portions below said notches being provided with a vertical elongated slot, a substantially U-shaped bar having the ends adapted to fit between the vertical portions of said first brackets, a padded head rest mounted on the central portion of said bar and means for mounting a pair of vertically spaced pins at the end of said bar on the side thereof adjacent the inner faces of the vertical portions of said first brackets, the uppermost of each of said pair of pins being adapted to rest in one of said notches, while the lowermost of said pins rests in the bottom of said vertical slot, the said U-shaped bar being of substantially square cross section, and a pair of second brackets of substantially U-shaped cross section, each of which being adapted to straddle one end of the said U-shaped bar with the central portions of the said second brackets adjacent the inner faces of the said vertical portions, means at one side of the said second brackets for securing the same to the ends of the said bar, the central portions of the said second brackets having a pair of vertically spaced openings and the said pins being located within the said openings and having enlarged heads, disposed intermediate the said bar and the central portion of the said second brackets.

References Cited in the file of this patent

UNITED STATES PATENTS 1,844,130    Larsen _____ Feb. 9, 1932